United States Patent
Chen

(10) Patent No.: US 9,542,282 B2
(45) Date of Patent: Jan. 10, 2017

(54) METHODS FOR SESSION FAILOVER IN OS (OPERATING SYSTEM) LEVEL AND SYSTEMS USING THE SAME

(71) Applicant: Wistron Corp., New Taipei (TW)

(72) Inventor: Chih-Ming Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 98 days.

(21) Appl. No.: 14/685,114

(22) Filed: Apr. 13, 2015

(65) Prior Publication Data

US 2016/0210208 A1    Jul. 21, 2016

(30) Foreign Application Priority Data

Jan. 16, 2015  (TW) .............................. 104101433 A

(51) Int. Cl.
G06F 11/14  (2006.01)
G06F 11/10  (2006.01)
G06F 11/20  (2006.01)
H04L 29/06  (2006.01)

(52) U.S. Cl.
CPC ....... *G06F 11/1484* (2013.01); *G06F 11/1064* (2013.01); *G06F 11/2043* (2013.01); *H04L 63/0823* (2013.01); *H04L 63/0876* (2013.01); *G06F 2201/815* (2013.01)

(58) Field of Classification Search
CPC .......................... G06F 11/1484; G06F 11/2043
See application file for complete search history.

(56) References Cited

U.S. PATENT DOCUMENTS

| | | | |
|---|---|---|---|
| 8,667,490 B1* | 3/2014 | van der Goot | G06F 9/45558 711/162 |
| 2005/0015661 A1* | 1/2005 | Vaidyanathan | G06F 11/0712 714/13 |
| 2005/0108593 A1 | 5/2005 | Purushothaman et al. | |
| 2011/0225342 A1* | 9/2011 | Sharma | G06F 12/08 711/6 |
| 2011/0239038 A1* | 9/2011 | Ito | G06F 11/1484 714/3 |
| 2012/0246517 A1* | 9/2012 | Bender | G06F 11/0712 714/45 |
| 2013/0091335 A1* | 4/2013 | Mulcahy | G06F 11/2038 711/163 |
| 2014/0040896 A1 | 2/2014 | Schmidt et al. | |
| 2014/0165056 A1* | 6/2014 | Ghai | G06F 12/0891 718/1 |
| 2014/0365816 A1* | 12/2014 | Antony | G06F 9/45558 714/6.11 |

(Continued)

OTHER PUBLICATIONS

Taiwan Patent Office, Office Action, Patent Application Serial No. 104101433, Sep. 23, 2016, Taiwan.

*Primary Examiner* — Yolanda L Wilson

(57) ABSTRACT

The invention introduces a method for session failover in OS (Operating System) level, which contains at least the following steps. A VM (Virtual Machine) OS is selected to perform a failover when a server OS is determined to have failed. A memory and a local storage device of the VM OS are mapped to the physical memory space and physical storage space of a distributed share-memory-and-cloud-storage, which were allocated for the failed server OS via a hypervisor corresponding to the VM OS. The OS state of the failed server OS is obtained from a distributed cache system via the hypervisor.

16 Claims, 7 Drawing Sheets

(56) References Cited

U.S. PATENT DOCUMENTS

| | | | |
|---|---|---|---|
| 2015/0095692 A1* | 4/2015 | Thiele | G06F 9/45533 714/6.11 |
| 2015/0178019 A1* | 6/2015 | Hegdal | G06F 3/0664 711/170 |
| 2015/0269031 A1* | 9/2015 | Wang | G06F 9/45558 718/1 |
| 2015/0378853 A1* | 12/2015 | Sevigny | G06F 11/2023 714/4.11 |

* cited by examiner

US 9,542,282 B2

METHODS FOR SESSION FAILOVER IN OS (OPERATING SYSTEM) LEVEL AND SYSTEMS USING THE SAME

CROSS REFERENCE TO RELATED APPLICATIONS

This application claims priority of Taiwan Patent Application No. 104101433, filed on Jan. 16, 2015, the entirety of which is incorporated by reference herein.

BACKGROUND

Technical Field

The present invention relates to failover, and in particular, to methods for session failover in OS (operating system) level and systems using the same.

Description of the Related Art

Multi-tier architecture is a type of client-server architecture in which the user interface, functional process logic, computer data storage, and data access are run as independent modules, most often on separate platforms. Multiple nodes are coordinated with a client session, starting from a front-end that carries out stateful communications with a client over TCP/IP, going through one or more tiers that implement application logic and ending with a database or storage server that manages persistent data. However, errors in OS (Operating System) level are difficult to recover, resulting in data loss of applications. Thus, it is desirable to have methods for session failover in OS level and systems using the same to address the aforementioned drawbacks.

BRIEF SUMMARY

An embodiment of the invention introduces a method for session failover in OS (Operating System) level, which contains at least the following steps. A VM (Virtual Machine) OS is selected to perform a failover when a server OS is determined to have failed. A memory and a local storage device of the VM OS are mapped to the physical memory space and physical storage space of a distributed share-memory-and-cloud-storage, which were allocated for the failed server OS via a hypervisor corresponding to the VM OS. The OS state of the failed server OS is obtained from a distributed cache system via the hypervisor.

An embodiment of the invention introduces a system for session failover in OS level, which contains at least a server OS, a VM OS, a distributed cache system, a distributed share-memory-and-cloud-storage and a health monitor. The health monitor selects the VM OS to perform a failover when determining that the server OS fails; maps a memory and a local storage device of the VM OS to the physical memory space and physical storage space of the distributed share-memory-and-cloud-storage, which were allocated for the failed server OS via a hypervisor corresponding to the VM OS; and obtains an OS state of the failed server OS from the distributed cache system via the hypervisor.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
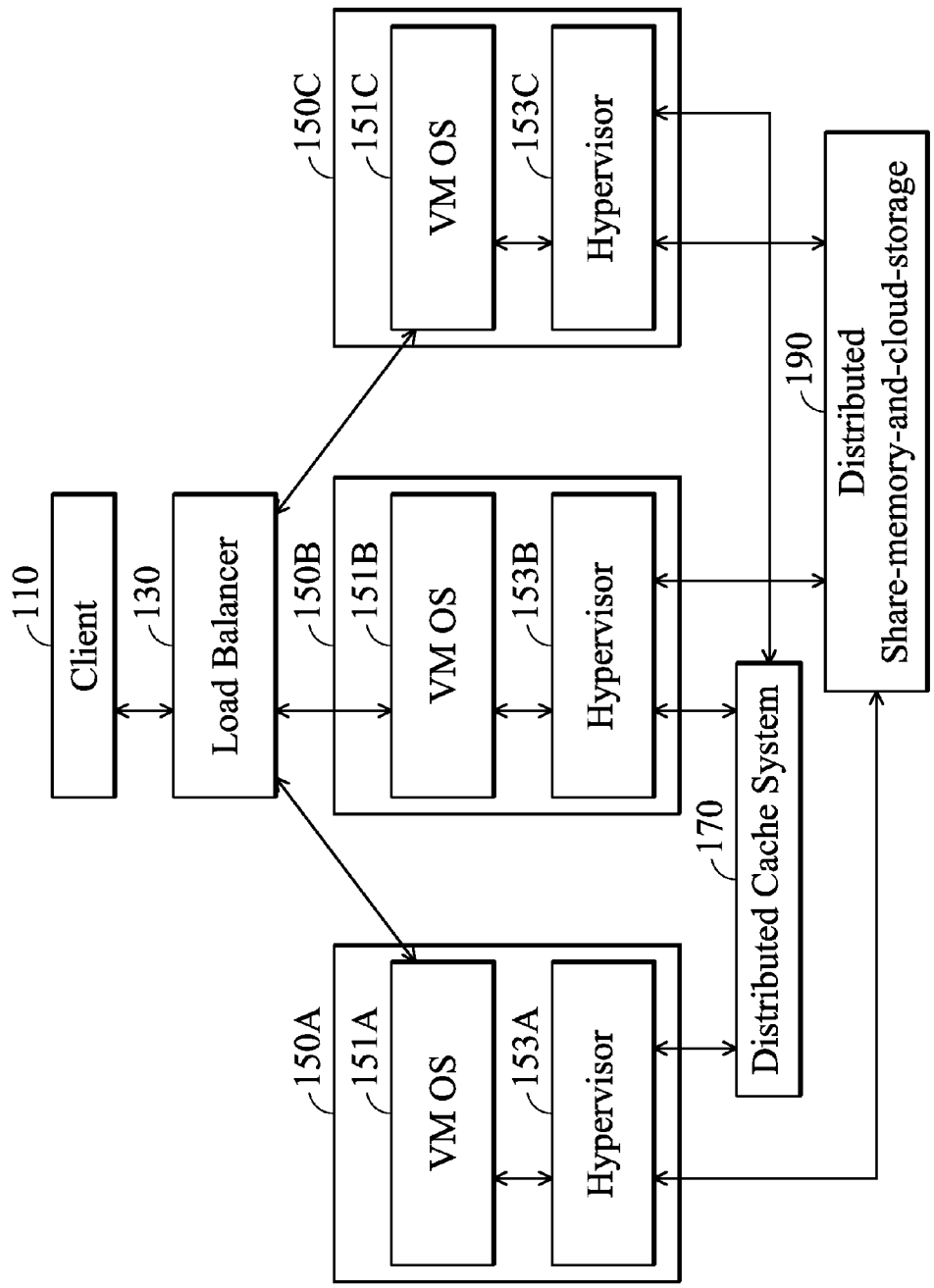
FIG. 1 is a schematic diagram of the system architecture for session failover in OS (Operating System) level according to an embodiment of the invention.

FIG. 1 is a schematic diagram of the system architecture for session failover in OS (Operating System) level according to an embodiment of the invention. A load balancer 130 may contain a health monitor to receive heartbeat signals periodically issued by a VM (Virtual Machine) OS. This means that the VM OS is alive when the health monitor receives a heartbeat signal issued by the VM OS. When no heartbeat signal has been received from the VM OS for a predetermined time interval, the health monitor determines that the VM OS fails and triggers a failover. It should be noted that the health monitor may not be integrated into the load balancer 130 and may be an independent module. A VM OS running on a physical computer apparatus, such as a VM OS 151A, typically needs a memory to store relevant data for a session, such as runtime variables, data tables, a certificate for a secure communication with a client 110, a certificate for connecting to a database, etc., and a storage device to store a wide range of digital files, such as Web pages, documents, audio files, video files, etc. The VM OS 151A may be referred to as a server OS to provide a wide range of application services according to requests from the client 110. The VM OS 151A does not directly employ a memory and a storage device of a physical computer apparatus 150A to store the relevant data for the session and the wide range of digital files, but stores that in a distributed share-memory-and-cloud-storage 190 via a hypervisor 153A. When the VM OS 151A malfunctions, the health monitor may start a VM OS 151A (which may be referred to as an embryo VM) and map a memory and a local storage device used by the started VM OS 151B to the physical memory space and physical storage space of the distributed share-memory-and-cloud-storage 190, which were used by the corresponding VM OS 151A. Therefore, applications previously run on the VM OS 151A can still access data and files of the distributed share-memory-and-cloud-storage 190 via the VM OS 151B. Another implementation of a failover method may migrate data and files of a memory and a storage device of the physical computer apparatus 150A into a memory and a storage device of a physical computer apparatus 150B. However, the migration of data and files may consume excessive time and the executions of applications cannot be transferred to the newly started VM OS before a data request timeout, causing a session fail. Risk of the session fail may be reduced by adopting the aforementioned mapping techniques. OS states corresponding to the VM OSs 151A, 151B and 151C are stored in a distributed cache system 170. The VM OSs 151A, 151B and 151C access data and files of the distributed cache system 170 and the distributed share-memory-and-cloud-storage 190 via the respective hypervisors 153A, 153B and 153C. Hypervisor 153A, 153B or 153C is responsible for error control (e.g. dealing with a packet loss) and handling the distributed cache system 170 and the distributed share-memory-and-cloud-storage 190, which can be implemented with high availability (e.g. data mirroring). The hypervisor can ensure the accuracy of data and files obtained by the corresponding VM OS. The VM OS 151B may obtain the latest OS states of the VM OS 151A from the distributed cache system 170 the latest session data and files of the VM OS 151A from the distributed share-memory-and-cloud-storage 190 before a system fail via the hypervisor 153B.

Figure 2A:
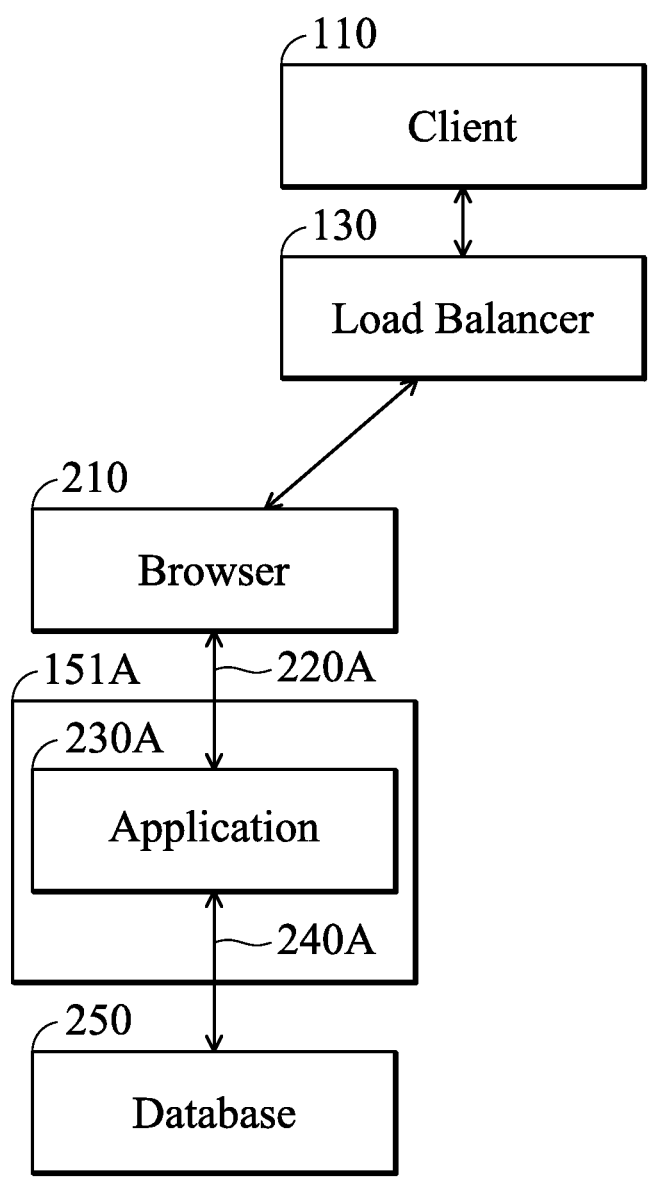
FIG. 2A is a schematic diagram of multi-tier architecture according to an embodiment of the invention.
Figure 2B:
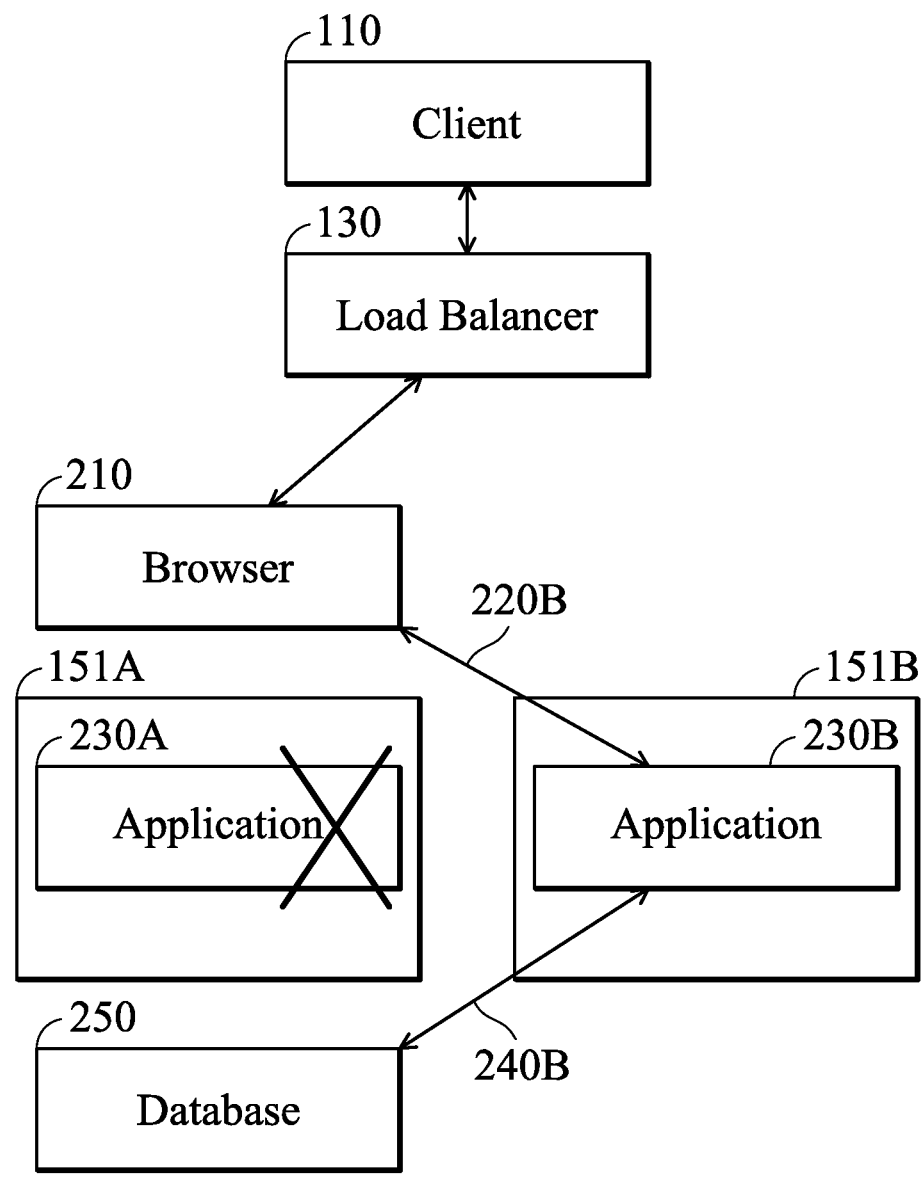
FIG. 2B is a schematic diagram of multi-tier architecture after a failover according to an embodiment of the invention.

In a failover, the VM OS 151B may re-establish needed connections. For example, FIG. 2A is a schematic diagram of multi-tier architecture according to an embodiment of the invention. An application 230A running on the VM OS 151A establishes a communications protocol connection 220A with a browser 210 (which may be referred to as a prior layer) and stores a communications protocol certificate in the allocated memory space of the share-memory-and-cloud-storage 190. In addition, the application 230A running on the VM OS 151A establishes a database connection 240A with a database 250 (which may be referred to as a subsequent layer) and stores a database certificate in the allocated memory space of the share-memory-and-cloud-storage 190. FIG. 2B is a schematic diagram of multi-tier architecture after a failover according to an embodiment of the invention. When the application 230A fails, the tasks of the application 230A may be transferred to an application 230B running on the VM OS 151B. The application 230B obtains the communications protocol certificate from the mapped memory space and establishes a new communications protocol connection 220B with the browser 210 using the communications protocol certificate. The application 230B obtains the database certificate from the mapped memory space and establishes a new database connection 240B using the database certificate.

Figure 3:
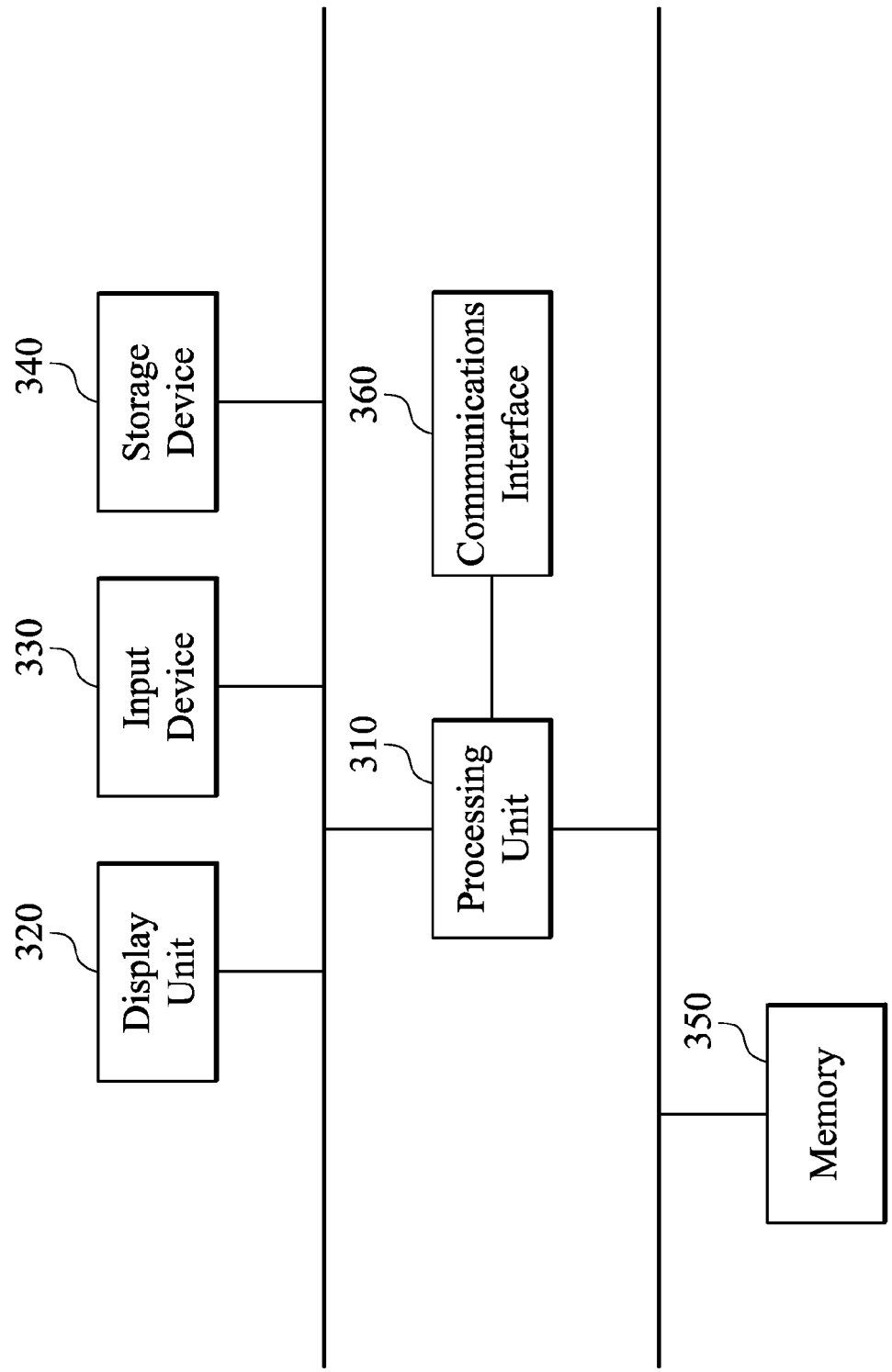
FIG. 3 is the system architecture of a computer apparatus according to an embodiment of the invention.

The load balancer 130, the VM OS 151A and the hypervisor 153A may be integrated in a single computer apparatus or distributed over several computer apparatuses. Similarly, a pairing of the VM OS 151B with the hypervisor 153B or a pairing of the VM OS 151C with the hypervisor 153C may be integrated in a single computer apparatus or distributed over several computer apparatuses. The distributed cache system 170 may contain many computer apparatuses to complete the storage and the mirroring of the OS states corresponding to the server OS. The distributed share-memory-and-cloud-storage 190 may contain many computer apparatuses to implement the memory and the local storage device corresponding to the server OS. FIG. 3 is the system architecture of a computer apparatus according to an embodiment of the invention. A processing unit 310 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 350 for storing necessary data in execution, such as runtime variables, data tables, a certificate for a secure communication with a client 110, a certificate for connecting to a database, etc., and a storage device 340 for storing a wide range of electronic files, such as Web pages, documents, video files, audio files, or others. A communications interface 360 is included in the system architecture and the processing unit 310 can thereby communicate with other electronic apparatuses. The communications interface 360 may be a wireless telecommunications module, a LAN (Local Area Network) communications module, a WLAN (Wireless Local Area Network), or any combination thereof. The wireless telecommunications module may have modems supporting arbitrary combinations of the 2G, 3G, 4G and the higher-generation technology. The system architecture further includes one or more input devices 330 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 320, such as a TFT-LCD (Thin film transistor liquid-crystal display) panel, an OLED (Organic Light-Emitting Diode) panel, or others, may also be included to display input letters, alphanumeric characters and symbols, dragged paths, drawings, or screens provided by an application for a user's viewing.

Figure 4:
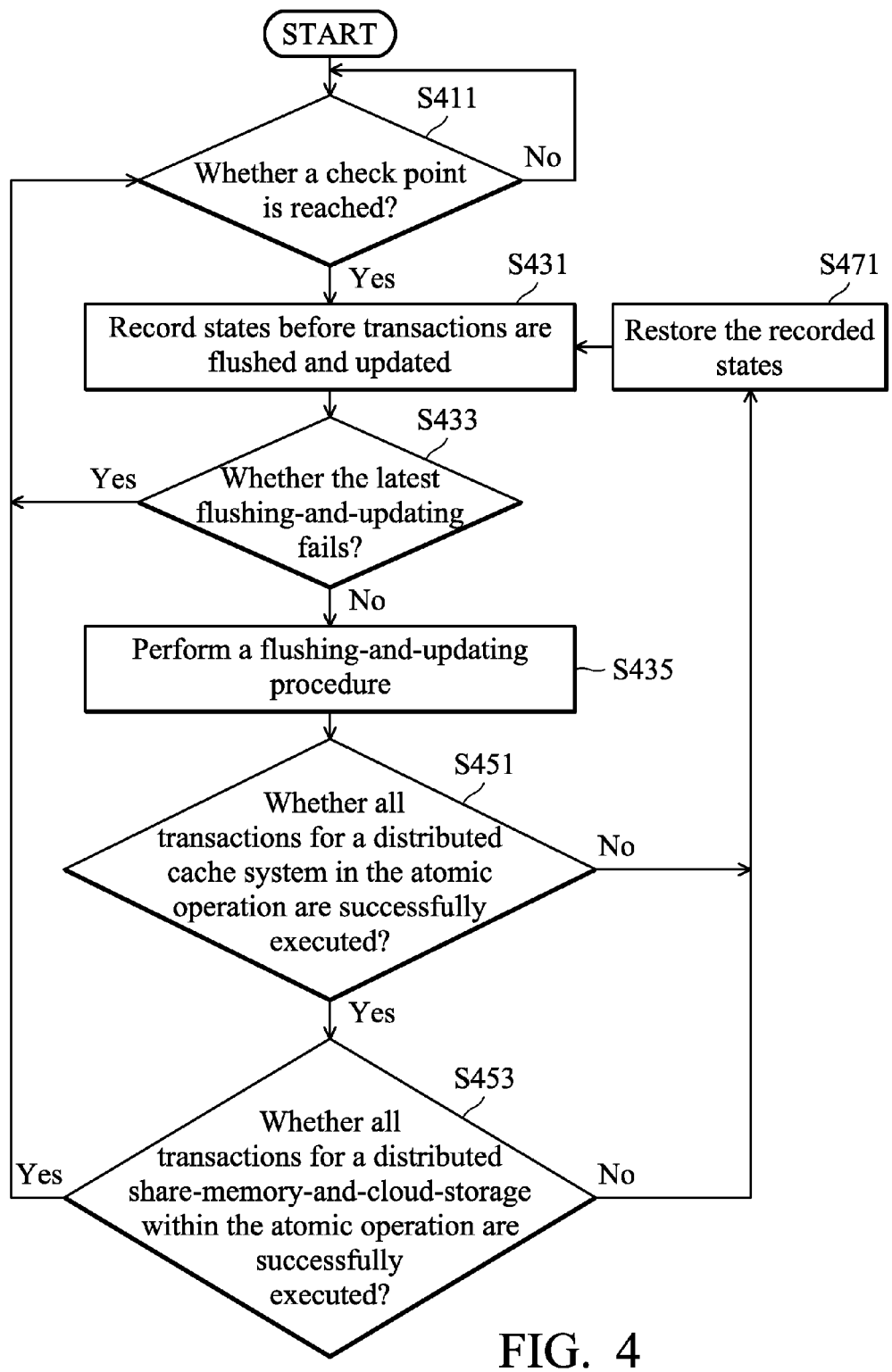
FIG. 4 is a flowchart illustrating a method for flushing and updating transactions according to an embodiment of the invention.
Figure 5:
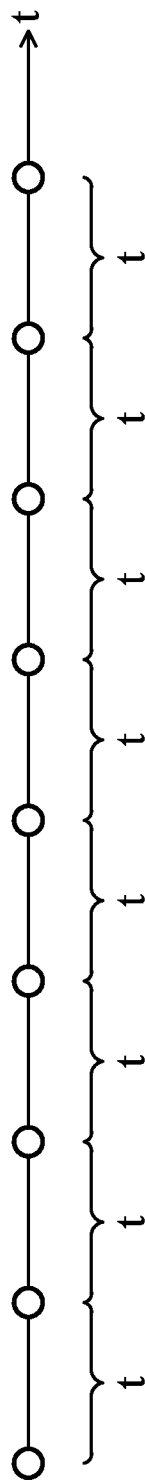
FIG. 5 is a schematic diagram of a periodic inspection according to an embodiment of the invention.

FIG. 4 is a flowchart illustrating a method for flushing and updating transactions according to an embodiment of the invention. The method is performed when the processing unit 310 loads and executes relevant software instructions of the server OS. The method periodically inspects whether a check point is reached (step S411) and performs a subsequent flushing-updating-and-restoring procedure after the check point is reached (steps S431 to S471). The flushing-updating-and-restoring procedure collects transactions for the distributed cache system 170 and the share-memory-and-cloud-storage 190 in a time interval as an atomic operation, executes transactions of the atomic operation and recovers the executed transactions when any transaction of the atomic operation fails. FIG. 5 is a schematic diagram of a periodic inspection according to an embodiment of the invention. The processing unit 110 executes the flowchart as shown in FIG. 4 at regular time intervals t. Specifically, after the time reaches a check point (step S411), states are recorded before transactions are flushed and updated (step S431). In step S431, the states contain OS states of the distributed cache system 170, data and files of the distributed share-memory-and-cloud-storage 190, which correspond to the server OS, and transactions for the distributed cache system 170 and the distributed share-memory-and-cloud-storage 190, which have not been flushed and updated. Transaction for the distributed cache system 170, which have not been flushed and updated, include inserting, deleting and updating OS states. Transaction for the distributed share-memory-and-cloud-storage 190, which have not been flushed and updated, include inserting, deleting and updating the needed data in a session and a wide range of digital files. Next, it is determined whether the latest flushing-and-updating fails (step S433). If so, transactions for the distributed cache system 170 and the distributed share-memory-and-cloud-storage 190 are accumulated until the next check point (step S411). Otherwise, a flushing-and-updating procedure is performed (step S435). It should be noted that, when the latest flushing-and-updating fails, a state-updating flag is set to "false". In step S433, the server OS may determine whether the latest flushing-and-updating has failed according to the state-updating flag. In step S435, the server OS executes all transactions for the distributed cache system 170 and the distributed share-memory-and-cloud-storage 190 in an atomic operation and collects an execution outcome (successful or failed) of each transaction. After the flushing-and-updating procedure is performed (step S435), two judgments are made: determining whether all transactions for the distributed cache system 170 within the atomic operation are successfully executed (step S451); and determining whether all transactions for the distributed share-memory-and-cloud-storage 190 within the atomic operation are successfully executed (step S453). When the two conditions are satisfied (the "Yes" path of step S453 following the "Yes" path of step S451), it means that the flushing-and-updating procedure is successful and the processing unit 310 continues to accumulate new transactions until the next check point (step S411). When the two conditions are satisfied, the server OS also sets the state-updating flag to "true". When either condition is not satisfied (the "No" path of step S451 or the "No" path of step S453), the recorded states are restored (step S471). In step S471, the server OS sets the state-updating flag to "false".

Figure 6:
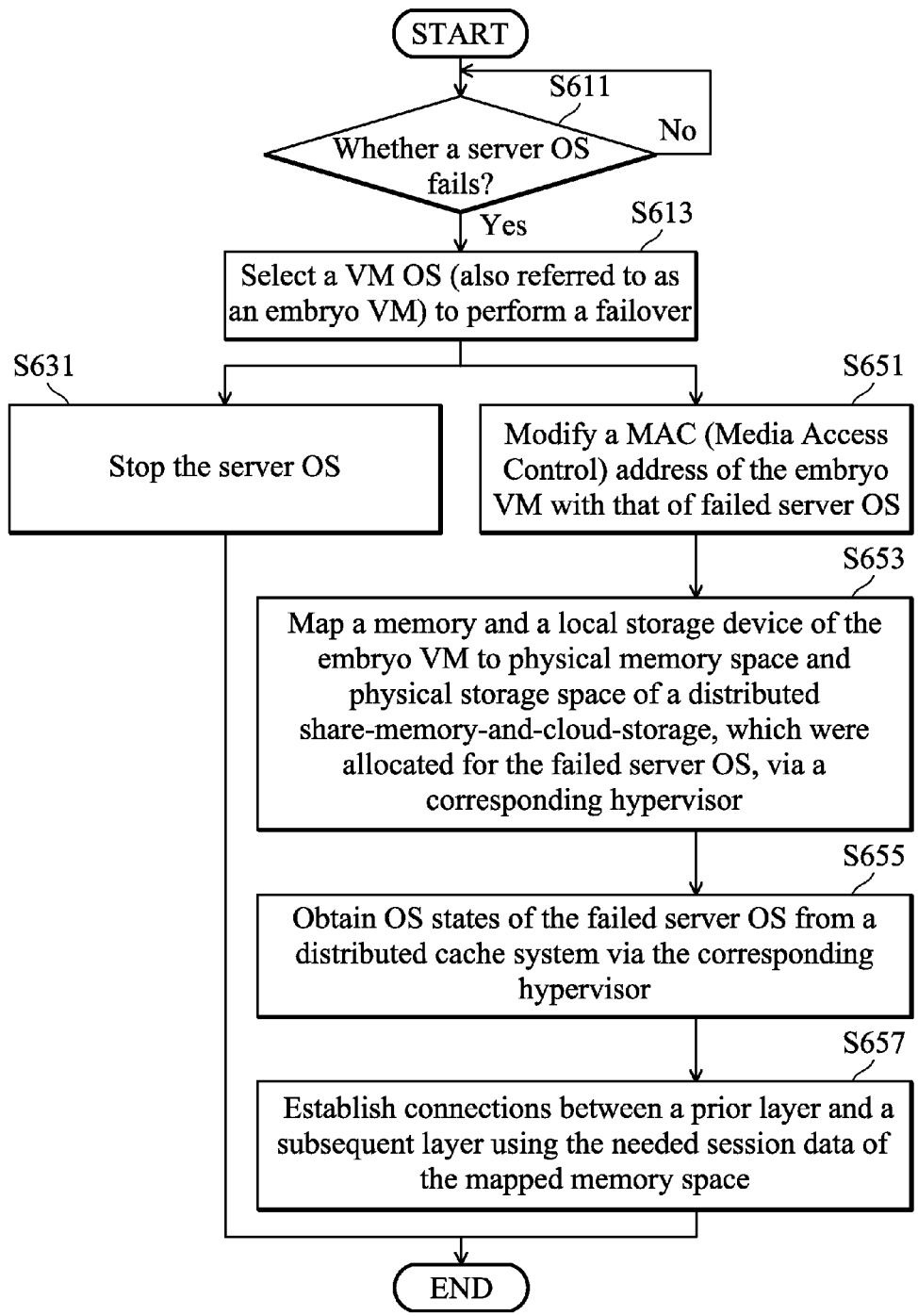
FIG. 6 is a flowchart illustrating a method for a failover according to an embodiment of the invention.

FIG. 6 is a flowchart illustrating a method for a failover according to an embodiment of the invention. The method is performed when the processing unit 310 loads and executes relevant software instructions. The health monitor periodically determines whether the server OS has failed (step S611). Once determining that the server OS has failed (the "Yes" path of step S611), the health monitor selects a VM OS (also referred to as an embryo VM) to perform a failover (step S613). The embryo VM is an empty VM OS, which no physical memory space and physical storage space of the distributed share-memory-and-cloud-storage 190 is mapped to, and no OS state of the empty VM OS is stored in the distributed cache system 170. Subsequently, on the one hand, the health monitor stops the server OS (step S631). On the other hand, the health monitor modifies a MAC (Media Access Control) address of the embryo VM with that of the failed server OS (step S651), maps a memory and a local storage device of the embryo VM to the physical memory space and physical storage space of the distributed share-memory-and-cloud-storage 190, which were allocated for the failed server OS, via a corresponding hypervisor (step S653), obtains the OS states of the failed server OS from the distributed cache system 170 via the corresponding hypervisor (step S655), and establishes connections between a prior layer and a subsequent layer using the needed session data of the mapped memory space, such as runtime variables, data tables, certificates, etc. (step S657). For example, when selecting the VM OS 151B to perform a failover (step S613), the health monitor, via the hypervisor 153B, performs mappings of a memory and a local storage device (step S653) and obtains the OS states (step S655). Moreover, for examples of step S657, reference may be made to the descriptions of FIGS. 2A and 2B. It should be noted that, after completing the configurations of steps S651 to S657, the VM OS 151B becomes a new server OS. Once becoming a server OS, the VM OS 151B performs the method as shown in FIG. 4.

Although the embodiment has been described as having specific elements in FIG. 1, it should be noted that additional elements may be included to achieve better performance without departing from the spirit of the invention. While the process flows described in FIGS. 4 and 6 each include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for session failover in OS (Operating System) level, executed by a processing unit, comprising:
   selecting a VM (Virtual Machine) OS to perform a failover when determining that a server OS fails;
   mapping a memory and a local storage device of the VM OS to physical memory space and physical storage space of a distributed share-memory-and-cloud-storage, which were allocated for the failed server OS via a hypervisor corresponding to the VM OS; and
   obtaining an OS state of the failed server OS from a distributed cache system via the hypervisor.

2. The method of claim 1, wherein it is determined that the server OS fails when no heartbeat signal has been received from the server OS for a predetermined time interval.

3. The method of claim 1, further comprising:
   modifying a MAC (Media Access Control) address of the VM OS with a MAC address of the failed server OS.

4. The method of claim 3, further comprising:
   obtaining a first certificate from the mapped memory space and establishing a first connection between the VM OS and a prior layer using the first certificate; and
   obtaining a second certificate from the mapped memory space and establishing a second connection between the VM OS and a subsequent layer using the second certificate.

5. The method of claim 4, further comprising:
   performing, by the VM OS, a flushing-updating-and-restoring procedure at regular check points.

6. The method of claim 5, wherein the flushing-updating-and-restoring procedure collects transactions for the distributed cache system and the share-memory-and-cloud-storage in a time interval as an atomic operation, executes the transactions of the atomic operation and recovers the executed transactions when any transaction of the atomic operation fails.

7. The method of claim 1, further comprising:
   stopping the failed server OS.

8. The method of claim 7, wherein the hypervisor performs an error control of a data communication between the hypervisor and the distributed cache system, performs an error control of a data communication between the hypervisor and the distributed share-memory-and-cloud-storage and handles the distributed cache system and the distributed share-memory-and-cloud-storage, which are implemented with availability.

9. A system for session failover in OS (Operating System) level, comprising:
- a server OS;
- a VM (Virtual Machine) OS;
- a distributed cache system;
- a distributed share-memory-and-cloud-storage; and
- a health monitor, selecting the VM OS to perform a failover when determining that the server OS fails; mapping a memory and a local storage device of the VM OS to physical memory space and physical storage space of the distributed share-memory-and-cloud-storage, which were allocated for the failed server OS via a hypervisor corresponding to the VM OS; and obtaining an OS state of the failed server OS from the distributed cache system via the hypervisor.

10. The system of claim 9, wherein the health monitor determines that the server OS fails when no heartbeat signal has been received from the server OS for a predetermined time interval.

11. The system of claim 9, wherein the health monitor modifies a MAC (Media Access Control) address of the VM OS with a MAC address of the failed server OS.

12. The apparatus of claim 11, wherein the VM OS obtains a first certificate from the mapped memory space, establishes a first connection between the VM OS and a prior layer using the first certificate, obtains a second certificate from the mapped memory space and establishes a second connection between the VM OS and a subsequent layer using the second certificate.

13. The apparatus of claim 12, wherein the VM OS performs a flushing-updating-and-restoring procedure at regular check points.

14. The apparatus of claim 13, wherein the flushing-updating-and-restoring procedure collects transactions for the distributed cache system and the share-memory-and-cloud-storage in a time interval as an atomic operation, executes the transactions of the atomic operation and recovers the executed transactions when any transaction of the atomic operation fails.

15. The apparatus of claim 9, wherein the health monitor stops the failed server OS.

16. The apparatus of claim 9, wherein the hypervisor performs an error control of a data communication between the hypervisor and the distributed cache system, performs an error control of a data communication between the hypervisor and the distributed share-memory-and-cloud-storage and handles the distributed cache system and the distributed share-memory-and-cloud-storage, which are implemented with availability.

* * * * *